(12) United States Patent
Ali et al.

(10) Patent No.: US 9,024,659 B2
(45) Date of Patent: May 5, 2015

(54) METHOD AND APPARATUS FOR PASSIVE EQUALIZATION AND SLEW-RATE CONTROL

(71) Applicant: Broadcom Corporation, Irvine, CA (US)

(72) Inventors: Tamer Ali, Irvine, CA (US); Hassan Maarefi, San Jose, CA (US); Mahmoud Reza Ahmadi, Huntington Beach, CA (US); Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/072,641

(22) Filed: Nov. 5, 2013

(65) Prior Publication Data

US 2015/0092829 A1 Apr. 2, 2015

Related U.S. Application Data

(60) Provisional application No. 61/884,968, filed on Sep. 30, 2013.

(51) Int. Cl.
*H03K 19/094* (2006.01)
*H03K 17/16* (2006.01)
*H04L 25/03* (2006.01)

(52) U.S. Cl.
CPC . *H04L 25/03019* (2013.01); *H04L 2025/03471* (2013.01); *H04L 2025/03681* (2013.01)

(58) Field of Classification Search
CPC .............. H04L 25/0272; H04L 25/028; H04L 25/0292; H03K 19/00361; H03K 19/00346; H03K 19/009424; H03K 17/164; H03K 17/54
USPC ............ 326/82, 83, 85, 26, 27; 327/140, 379, 327/108, 109
See application file for complete search history.

(56) References Cited

U.S. PATENT DOCUMENTS 8,878,568 B1 * 11/2014 Farzan et al. ................... 326/82
2006/0220674 A1 * 10/2006 Yeung et al. .................... 326/29
2011/0103267 A1 * 5/2011 Devuyst et al. ............... 370/276

OTHER PUBLICATIONS

Dally, et al., "Transmitter Equalization for 4Gb/s Signalling," Proc. of Hot Interconnects 1996, pp. 29-39, Stanford University, Aug. 15-17, 1996. Also in IEEE Micro, pp. 48-56, Jan./Feb. 1997, retrieved from <www.cs.unc.edu/~jp/Micro97.pdf>.
Circit, et al., "A 10Gb/s Half-UI IIR-Tap Transmitter in 40nm CMOS," 2011 IEEE International Solid-State Circuits Conference, Session 25, retrieved from <http://ee.tamu.edu/~spalermo/ecen689/iir_tx_cirit_isscc_2011.pdf>, 3 pages.

* cited by examiner

*Primary Examiner* — Dylan White
(74) *Attorney, Agent, or Firm* — McDermott Will & Emery LLP

(57) ABSTRACT

A device for passive equalization and slew-rate control of a signal includes a first branch and a second branch. The first branch includes a first driver coupled in series with an equalization capacitor. The second branch includes a second driver coupled in series with a resistor. The second branch may be coupled in parallel to the first branch. The first branch may be configurable to enable either passive equalization or slew-rate control of the signal based on a mode control signal.

20 Claims, 5 Drawing Sheets

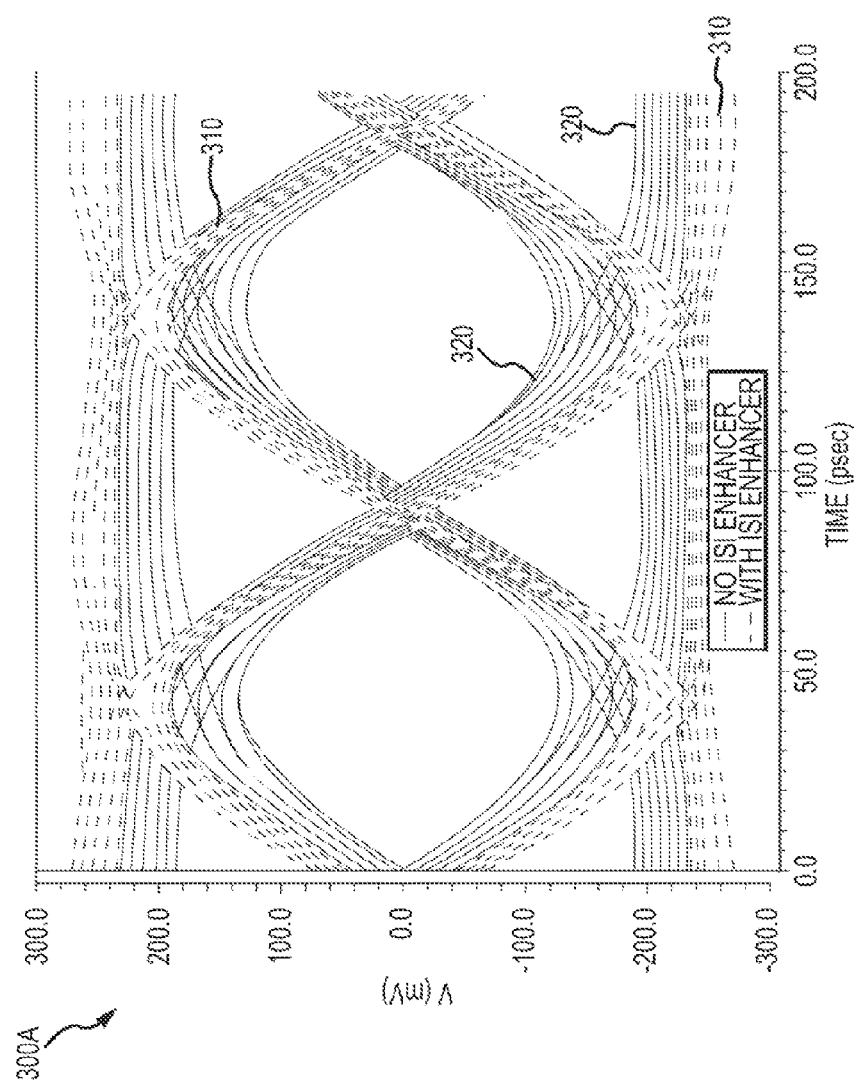

METHOD AND APPARATUS FOR PASSIVE EQUALIZATION AND SLEW-RATE CONTROL

CROSS-REFERENCE TO RELATED APPLICATIONS

This application claims the benefit of priority under 35 U.S.C. §119 from U.S. Provisional Patent Application 61/884,968 filed Sep. 30, 2013, which is incorporated herein by reference in its entirety.

TECHNICAL FIELD

The present description relates generally to data communication, and more particularly, but not exclusively, to method and apparatus for passive equalization and slew-rate control.

BACKGROUND

Channel equalization in communication systems may be used to flatten the frequency response of a communication channel such as a wire-line, an optical fiber, or a radio-frequency (RF) channel. A flat frequency response can allow a faithful reproduction of the attributes of the input signal of the communication channel at the output end of the communication channel. Many equalizers are implemented in digital, for example, by a large number of finite impulse response (FIR) de-emphasis taps (e.g., pre and post-tap drivers) to equalize channels that have long impulse response tails. These equalizer may be power hungry, inefficient, and result in a significant drop (e.g., de-emphasis) of the peak amplitude.

Amplitude equalization may be effective in opening eye diagram amplitude and to some extent in opening eye diagram width (e.g., edge equalization), but may be less effective in edge equalization and in boosting the rise/fall time of the equalizer output signal. Voltage mode drivers used in some existing equalizers may contribute to output capacitances that can significantly increase as the number of driver slices increase and can drastically impact rise and/or fall times of the driver output signals. Other existing solutions may use a low-pass filter (LPF) after a post-tap driver to generate a decaying tail that can match the impulse response of the channel with an opposite polarity. Such solutions may be adequate for current-mode logic (CML) drivers where a linear data buffer can be easily implemented.

BRIEF DESCRIPTION OF THE DRAWINGS

Certain features of the subject technology are set forth in the appended claims. However, for purpose of explanation, several embodiments of the subject technology are set forth in the following figures.

FIGS. 3A-3B illustrate examples of eye diagrams depicting impacts of inter-symbol-interference (ISI) enhancement in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In on more aspects, a method and a device for passive equalization (e.g., continuous-time de-emphasis) and slew-rate control for use with CMOS voltage-mode drivers are described. The voltage-mode drivers may consume substantially (e.g., 75%) less power than current-mode logic (CML) drivers. The subject technology may be most effective in edge equalization of channels that have impulse responses with long tail with almost no power penalty due to passive nature of the applied scheme, and can control slew rate to improve rise/fall time of drivers. The disclosed device is scalable in size and power with technology node scaling and can be an important part of any high-bandwidth system-on-chip (SOC) and telecommunication application. The subject technology can cancel inter-symbol interference (ISI) due to package loss and on-chip capacitance, and eliminates the need for high-order filters to equalize channels with long impulse response tails.

Figure 1:
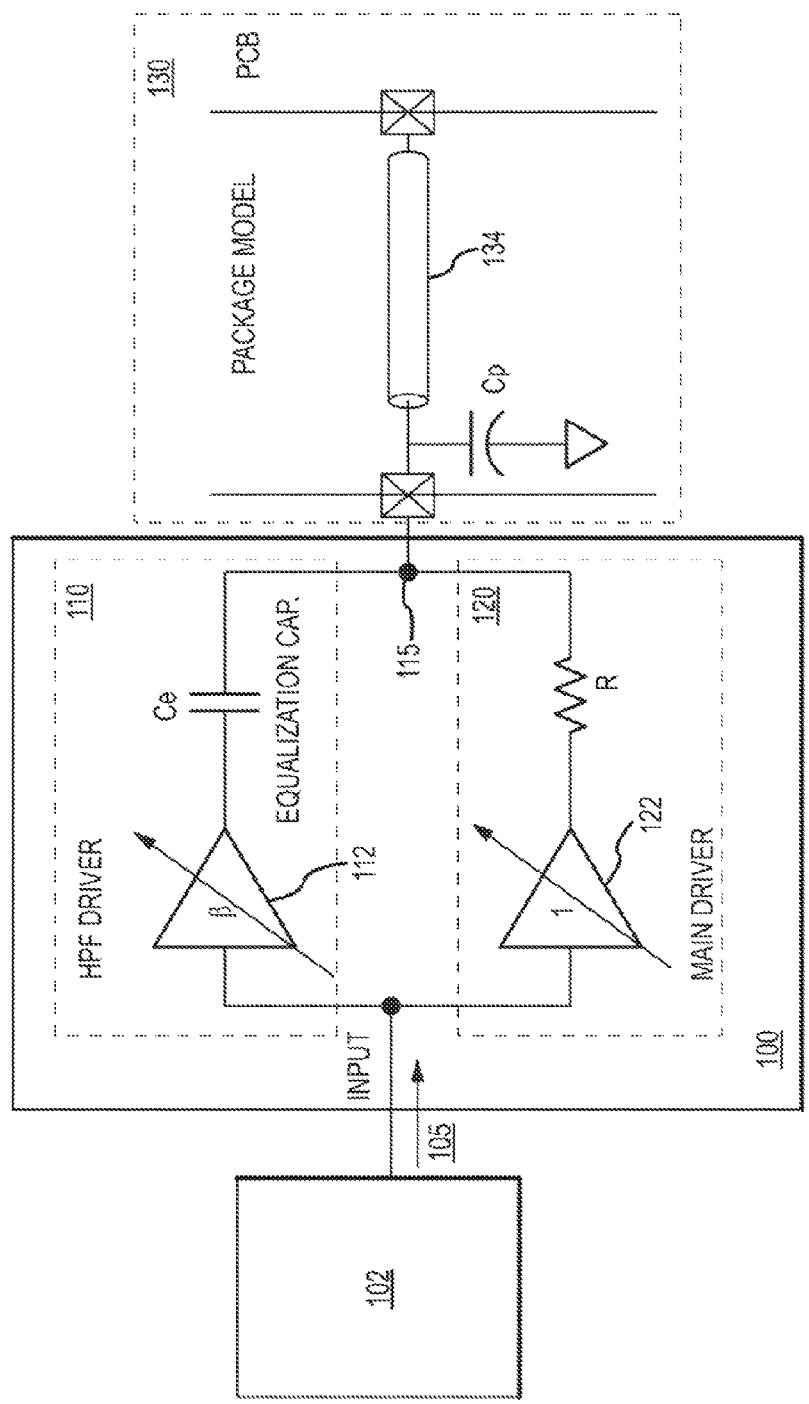
FIG. 1 illustrates an example of a device for passive equalization and slew-rate control of a signal in accordance with one or more implementations.

FIG. 1 illustrates an example of a device 100 for passive equalization and slew-rate control of a signal in accordance with one or more implementations of the subject technology. The device 100 may be a voltage mode driver, and includes a first branch 110 and a second branch 120. The first branch 110 may include a first driver 112 (e.g., a high-pass filter (HPF) driver) that is coupled in series with an equalization capacitor Ce. The second branch 120 may include a second driver 122 that is coupled in series with a resistor R (e.g., 50Ω). The second branch 120 is coupled in parallel to the first branch 110. The first branch 120 may be configured to enable passive equalization or slew-rate control based on a mode control signal, as discussed in more detail herein.

In one or more aspects, the device 100 can be configured to be compatible with voltage mode driver implementation that consume substantially (e.g., 75%) less power than CML drivers. The device 100 may receive an input signal 105 from another chip 102 (e.g., a transmit circuit) and may be coupled at the output node 115 to another chip via a circuit board (e.g., a printed circuit board (PCB)) interface 130, which may be thought of as a channel. A circuit model of the channel 130 includes a capacitor Cp and a transmission line 134, which act as a passive load for the device 100. In one or more aspects, the equalization capacitance Ce of the device 100 can control slew rate to improve rise/fall time of the signal at the output node 115, due to the capacitance Cp of the channel 130 and on-chip capacitances, and can improve channel long tail impulse response. In other words, the device 100 may allow cancellation of the filtering effect of the channel 130 on the output signal at the output node 115, and thus can flatten the frequency response. In some aspects, the equalization capacitance Ce can represent a high-pass filter that equalizes the channel response (e.g., a low pass filter response). The equalization capacitance Ce can be programmable, depending on the channel used, and can be added either on a main tap or one or more post taps, as described herein.

Figure 2:
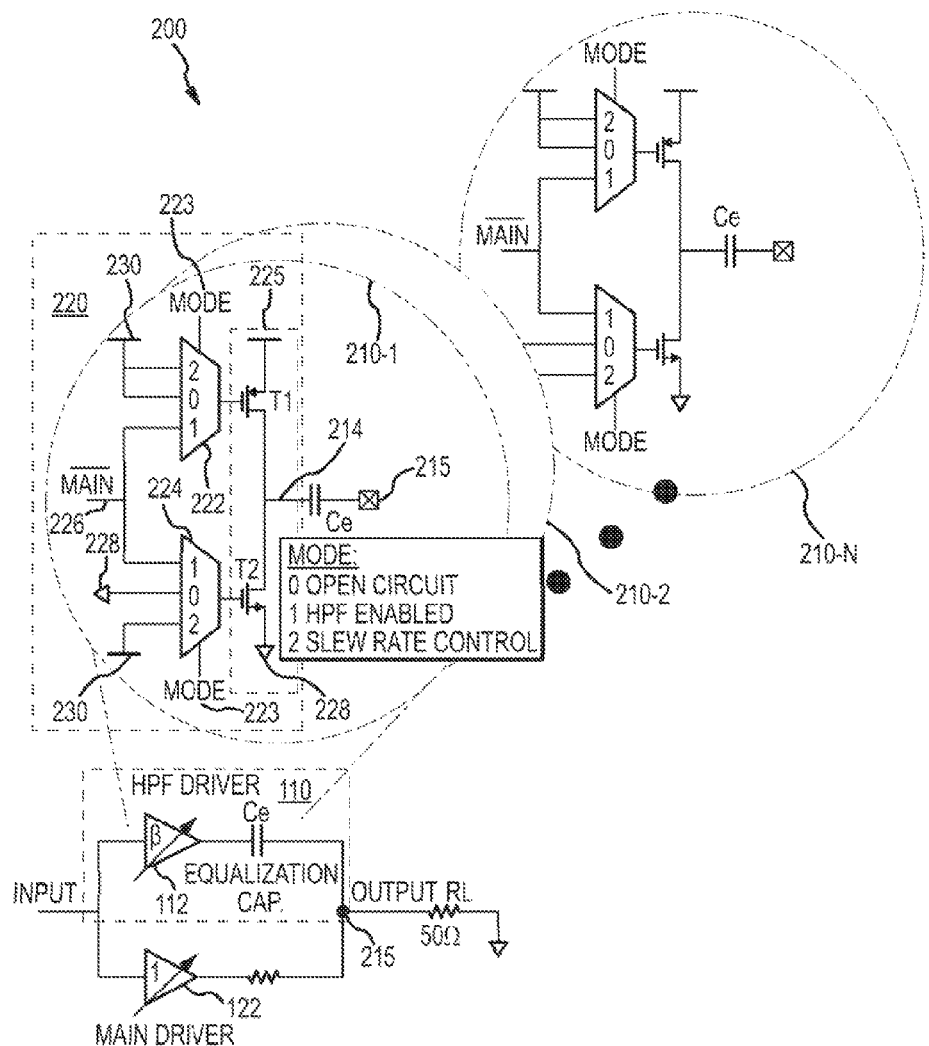
FIG. 2 illustrates an example implementation of the device of FIG. 1 in accordance with one or more implementations.

FIG. 2 illustrates an example implementation 200 of the device 100 of FIG. 1 in accordance with one or more implementations of the subject technology. In the implementation 200, the first branch 110 may be realized by N parallel slices 210-1, 210-2 . . . 210-N. The N parallel slices 210-1, 210-2 . . . 210-N may provide high-pass filtering and slew-rate control programmability. In each slice (e.g., 210-1) the first driver 112 may be implemented by a driver circuit 220 coupled to the equalization capacitance Ce. In one or more implementations, the driver circuit 220 includes a pair of multiplexers 222 and 224 coupled to the gates of transistors T1 and T2 of a CMOS driver 225 (e.g., with a gain of β). The pair of multiplexer 222 and 224 may be configured to enable operation of the device 200 in a number of modes, such as a passive equalization or a slew-rate control mode of operation based on a mode control signal 223. In the passive equalization mode of operation, when the mode control signal 223 is equal to one, the input signal 226 is coupled through the CMOS driver 225 to the equalization capacitor Ce, which, in conjunction with the load resistor RL (e.g., 50Ω), enables the first branch 110 to function as a high-pass filter (e.g., a C-R filter).

In the slew-rate control mode of operation, when the mode signal 223 is equal to two, the gates of the transistors T1 (e.g., a PMOS transistor) and T2 (e.g., an NMOS transistor) are coupled to a positive supply voltage 230. Therefore transistor T1 is off and transistor T2 is on and couples terminal 214 of the capacitor Ce to ground potential 228. In other words, in the slew-rate mode, the equalization capacitor Ce can be configured to be coupled between an output node 215 of the device 200 and ground potential 228 to reduce rise and fall time of an output signal of the device by increasing an output capacitance of the device. The driver output capacitance can be increased considerably by increasing the number of slices.

When the mode signal 223 is equal to zero, the gates of transistor T1 and transistor T2 are respectively coupled to positive supply voltage 230 and ground potential 228, this both transistors T1 and T2 are off and the first branch 110 is an open circuit. In some aspects, the device 200 may be configured to operate in a differential signaling mode. The second driver 122 may have a gain value of one or other values, and may be realized with a CMOS driver, for example, similar to the CMOS driver 225.

Figure 3B:
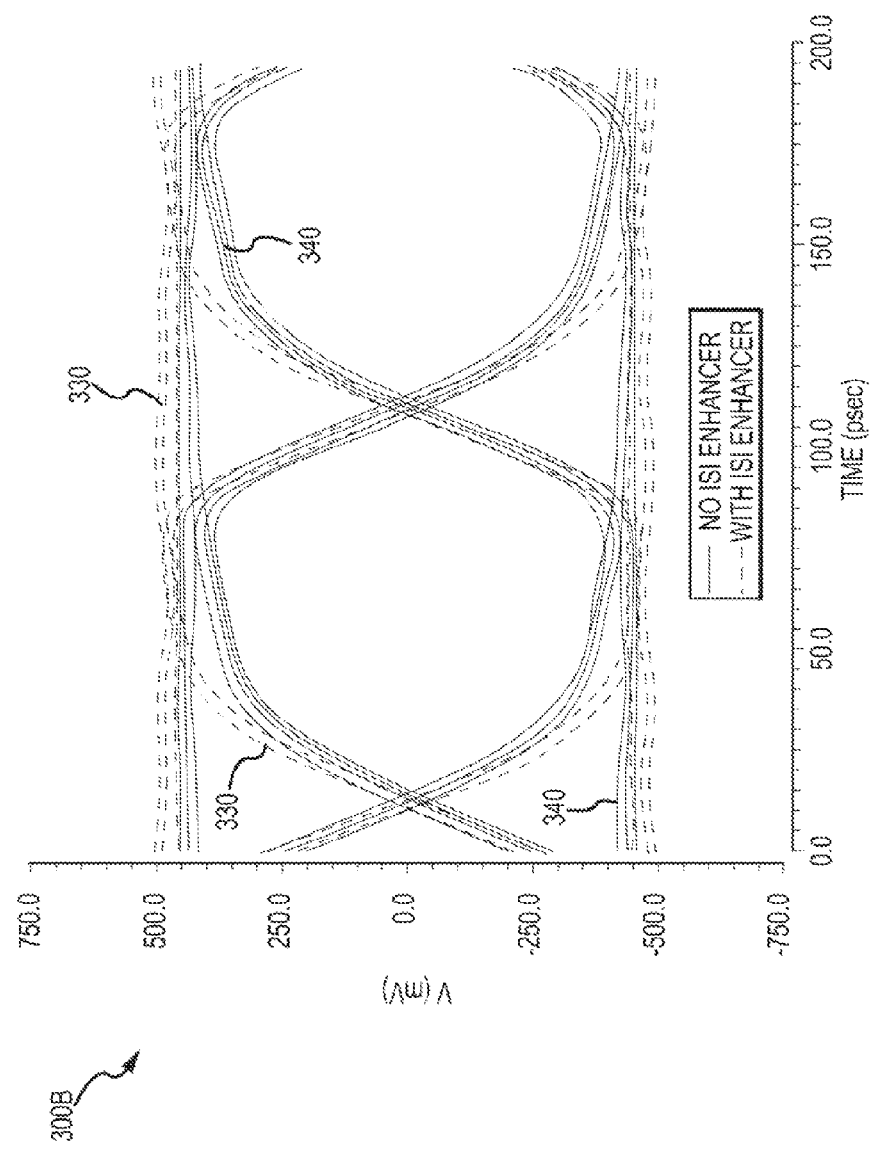

FIGS. 3A-3B illustrate examples of eye diagrams depicting impacts of inter-symbol-interference (ISI) enhancement in accordance with one or more implementations of the subject technology. In the eye diagram 300A of FIG. 3A, the traces 310 and 320 are respectively corresponding to ISI enhancer and no ISI enhancer cases. The ISI enhancement can be achieved by switching on the passive equalizer (e.g., device 200 of FIG. 2), which can be used for equalizing small form factor (SFP) transceivers and optical channels to reduce the ISI by approximately 67%. The ISI enhancement is seen to open the eye in the voltage axis direction (e.g., amplitude equalization) as well as enhancing the eye width (e.g., edge equalization).

In the eye diagram 300B of FIG. 3B, the traces 330 and 340 are respectively corresponding to ISI enhancer and no ISI enhancer cases. The ISI enhancement (e.g., reduction by approximately 50%) can be achieved by switching on the passive equalizer (e.g., device 200 of FIG. 2) for cancelling package capacitance. The ISI enhancement is seen to open the eye in the voltage axis direction (e.g., amplitude equalization).

Figure 4:
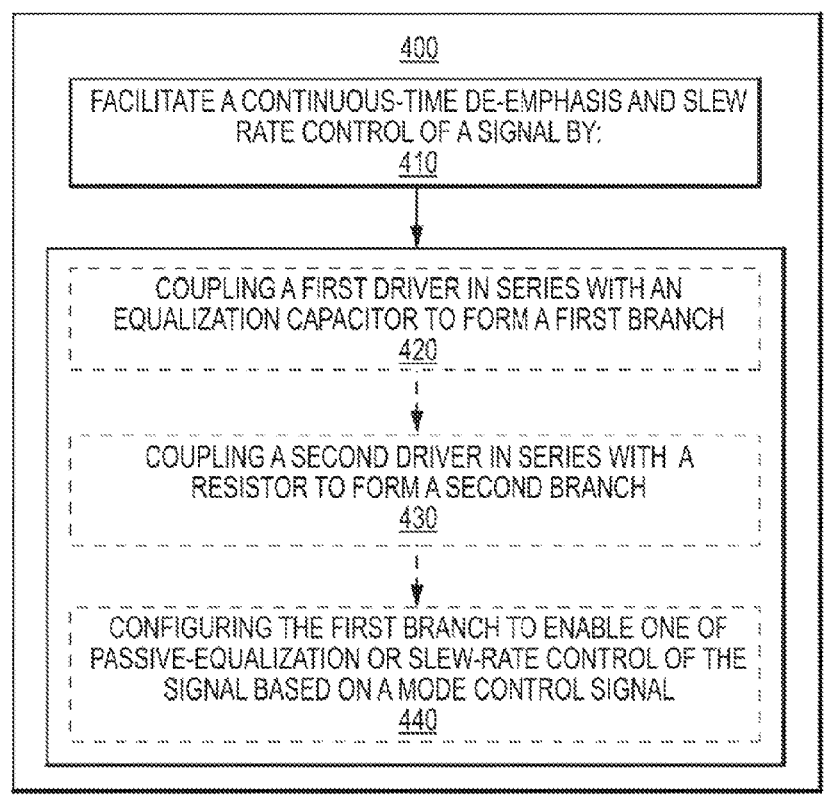
FIG. 4 illustrates an example of a method for passive equalization and slew-rate control of a signal in accordance with one or more implementations.

FIG. 4 illustrates an example of a method 400 for passive equalization and slew-rate control of a signal in accordance with one or more implementations of the subject technology. For the explanatory purposes, the blocks of the example method 400 are described herein as occurring in serial, or linearly. However, multiple blocks of the example method 400 may occur in parallel. In addition, the blocks of the example method 400 need not be performed in the order shown and/or one or more of the blocks of the example method 400 need not be performed.

A passive equalization and slew-rate control of a signal may be facilitated by (410): coupling a first driver (e.g., 112 of FIG. 1) in series with an equalization capacitor (e.g., Ce of FIG. 1) to form a first branch (e.g., 110 of FIG. 1) (420); coupling a second driver (e.g., 122 of FIG. 1) in series with a resistor (e.g., R of FIG. 1) to form a second branch (e.g., 120 of FIG. 1); coupling the second branch in parallel to the first branch (430); and configuring the first branch to enable one of passive equalization or slew-rate control of the signal based on a mode control signal (e.g., 223 of FIG. 2) (440).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device for passive equalization and slew-rate control of a signal, the device comprising:
   a first branch comprising a first driver coupled in series with an equalization capacitor; and
   a second branch comprising a second driver coupled in series with a resistor,
   wherein the second branch is coupled in parallel to the first branch, and the first branch is configurable to enable one of passive equalization or slew-rate control of the signal based on a mode control signal.

2. The device of claim 1, wherein the device is configured to be compatible with a voltage mode driver implementation.

3. The device of claim 1, wherein the device comprises a main tap and one or more post taps, and wherein the first and the second branches are implemented in one of the main tap or the one or more post taps of the device.

4. The device of claim 1, wherein the first driver comprises a pair of multiplexers coupled to transistors of a first CMOS driver, wherein the second driver comprises a second CMOS driver.

5. The device of claim 4, wherein the pair of multiplexers are configured to enable operation of the device in one of a passive equalization or a slew-rate control mode based on a mode control signal.

6. The device of claim 4, wherein in the passive equalization mode of operation, the equalization capacitor is configured to enable functioning of the first branch as a high-pass filter.

7. The device of claim 4, wherein in the slew-rate control mode of operation, the equalization capacitor is configured to be coupled between an output node of the device and ground potential and reduce rise and fall time of an output signal of the device by increasing an output capacitance of the device.

8. The device of claim 1, wherein the device is configured to operate in a differential signaling mode, and wherein a plurality of slices, each slice comprising the first branch, are coupled in parallel to provide high-pass filtering and slew-rate control programmability.

9. A method for providing a device for enabling passive equalization and slew rate control of a signal, the method comprising:
   coupling a first driver in series with an equalization capacitor to form a first branch;
   coupling a second driver in series with a resistor to form a second branch;
   coupling the second branch in parallel to the first branch; and
   configuring the first branch to enable one of passive equalization or slew-rate control of the signal based on a mode control signal.

10. The method of claim 9, further comprising configuring parallel coupled first and second branches to be compatible with a voltage mode driver implementation.

11. The method of claim 9, further comprising forming a main tap and one or more post taps, and implementing the first and the second branches in one of the main tap or the one or more post taps.

12. The method of claim 9, further comprising forming the first driver by coupling a pair of multiplexers to transistors of a first CMOS driver, and forming the second driver by using a second CMOS driver.

13. The method of claim 12, further comprising configuring the pair of multiplexers to enable operation in one of a passive equalization or a slew-rate control mode based on a mode control signal.

14. The method of claim 12, further comprising, in the passive equalization mode of operation, configuring the equalization capacitor to enable functioning of the first branch as a high-pass filter.

15. The method of claim 12, further comprising, in the slew-rate control mode of operation, configuring the equalization capacitor to be coupled between an output node and ground potential and to reduce rise and fall time of an output signal by increasing an output capacitance.

16. The method of claim 9, further comprising enabling operation in a differential signaling mode, and coupling a plurality of slices, each slice comprising the first branch, in parallel to provide high-pass filtering and slew-rate control programmability.

17. A system comprising:
   a transmit circuit configured to transmit a signal; and
   a device for passive equalization and slew-rate control of the signal, the device comprising:
      a first branch that includes a first driver coupled in series with an equalization capacitor; and
      a second branch that includes a second driver coupled in series with a resistor,
      wherein the second branch is coupled in parallel to the first branch and the first branch is configurable to enable one of passive equalization or slew-rate control based on a mode control signal.

18. The system of claim 17, wherein the device is configured to be compatible with a voltage mode driver implementation.

19. The system of claim 17, wherein the device comprises a main tap and one or more post taps, and wherein the first and the second branches are implemented in one of the main tap or the one or more post taps of the device.

20. The system of claim 17, wherein the first driver comprises a pair of multiplexers coupled to transistors of a first CMOS driver, wherein the second driver comprises a second CMOS driver, and wherein the pair of multiplexers are configured to enable operation of the device in one of a passive equalization or a slew-rate control mode based on a mode control signal.

* * * * *